Dec. 31, 1935.   O. WEINRICH   2,025,922
METHOD FOR THE PRODUCTION OF FUSION WELDED HOLLOW BODIES
Filed Jan. 25, 1934

INVENTOR
OTTO WEINRICH
by his attorneys

Patented Dec. 31, 1935

2,025,922

UNITED STATES PATENT OFFICE 2,025,922

METHOD FOR THE PRODUCTION OF FUSION-WELDED HOLLOW BODIES

Otto Weinrich, Duisburg-Huckingen, Germany

Application January 25, 1934, Serial No. 708,331
In Germany January 27, 1933

1 Claim. (Cl. 29—148.2)

The invention concerns a method for the production of fusion-welded hollow bodies.

In the accompanying drawing—

Figure 2:
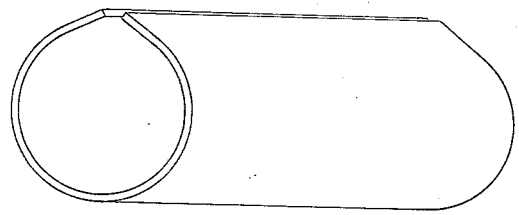
Figure 2 is a perspective view of the sheet after the operation of Figure 1 is completed.
Figure 3:
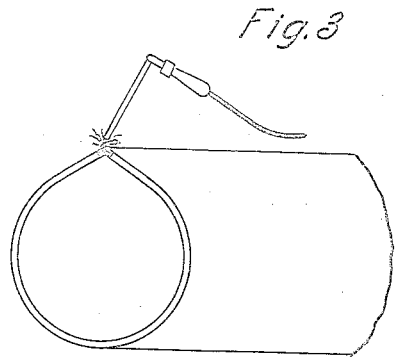
Figure 4:
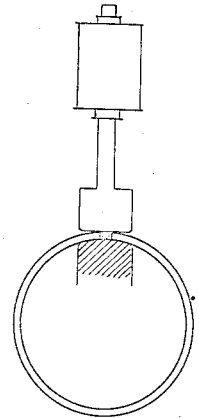

Figure 3 is a perspective view similar to Figure 2, showing the electric welding in which the metal of the welding rod or electrode is applied to the edges and forms a projecting welding ridge; and Figure 4 is a vertical cross-section through a water gas roll machine in which the unconformed edges and projecting welding ridge are simultaneously heated and pressed to conform the edges to the curvature and to reduce the projecting welding ridge to the thickness of the sheet.

Figure 1:
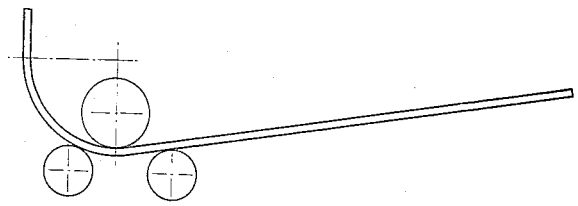
Figure 1 is an end elevation diagram of a three roll bending machine with a metal sheet therein being bent to a curvature and showing the edge of the sheet which remains departed from that curvature.

When making fusion-welded hollow bodies the difficulties in the preparation of the metal sheet and the edges of the sheet with the bending methods known nowadays, may become so great, particularly with very hard material, great length of cylinder and thick walls, that their manufacture no longer offers any economic advantages. The sheets of comparatively large diameter and with correspondingly thick walls, such as required for boiler drums for example bent (Figure 1) on the usual three or four roll bending machines, are not available for fusion-welding without further treatment, as the side edges of the sheet deviate more or less from the desired radius, or even remain straight, for a certain breadth, depending on the distance separating the lower rolls from one another and from the centre of the upper roll. Such sheets require a difficult and expensive subsequent treatment, as the straight or inaccurately bent strips of the sheet must be removed, the edges of the sheet planed before bending, bent together and again trued up.

Apart from this in the case of all pressure vessels, particularly those which are exposed to high temperatures when in use, such as boiler drums or the like, care must be taken to remove the welding ridge which remains, in order to avoid any heat accumulation and, in addition, to obtain a uniform tension distribution when the pressure body is under load. Where the vessel is subject to a fluctuating loading, a smooth seam is particularly important owing to its greater resistance to vibration compared to a more or less rough seam.

When the new method is employed, the nature and size of the sheets to be bent offer no difficulties. The method consists in that the edges of the metal sheet which remained straight during the bending process (Figures 1 and 2) are joined together by means of fusion welding, that is, by means of autogeneous or electric welding (Figure 3) with the addition of welding rods or electrodes, and after welding heated, in a gas fire for example, and rounded by hammering or pressing, whereby at the same time by means of the hammering or pressing (Figure 4), in a manner in itself known, the projecting welding ridges are brought down to the normal thickness of the material. The hammering or pressing may take place either intermittently or continuously and a water gas roll welding machine, for example, such as may be available in the works, can be used for heating the plate edges and for pressing. The result of this treatment is to improve the quality of the seam as, by means of the heating and the following smithing process, the welding stresses set up are equalized and, in addition, the deviations from the circular set up by the shrinking stresses are eliminated. These stresses would otherwise give rise, when the fusion-welded hollow body is in use, to undesired and dangerous additional bending stresses in the seam.

Apart from the improvement obtained in the quality of the welded seam, the method offers considerable advantages from the point of view of economy and manufacturing technique, which may be summarized as follows:—(1) An excess of material, which may amount to as much as 25% of the sheet material, depending on the length and thickness of wall of the body and on the type of bending rolls used, is no longer necessary, owing to the elimination of the losses of material.

(2) A subsequent treatment of the unwelded cylinder, which was still necessary in spite of the surplus sheet, is avoided.

(3) No additional expense is necessary for the removal of the weld ridges produced, which otherwise had to be removed with cutting tools, or by means of grinding on the outer and inner sides of the seam.

These savings in the costs of material and wages far outweigh the expenses for the heating and smithing of the seam.

I claim:

Method of producing electrically welded hollow bodies, which comprises subjecting a metal sheet to a bending operation which conforms the sheet between its edges to a curvature, leaving the edges departing from said curvature, subjecting said unconformed edges to an electric welding operation which applies metal to said edges and forms a projecting welding ridge, and finally subjecting said unconformed edges and welding ridge to a heating and pressing operation comprising a heating by combustion of a mixture of water, gas and air and a pressing by to and fro movement in the direction of the welding ridge of rolls under pressure for simultaneously conforming said edges to the curvature of the remainder of the sheet and reducing the welding ridge to the thickness of the remainder of the sheet.

OTTO WEINRICH.